US009128691B2

(12) United States Patent
Liu (10) Patent No.: US 9,128,691 B2
(45) Date of Patent: Sep. 8, 2015

(54) METHOD AND TERMINAL FOR SELECTING INTERNAL CIRCUIT ACCORDING TO USB INTERFACE STATUS (71) Applicant: Huawei Device Co., Ltd., Shenzhen (CN)

(72) Inventor: Shengcai Liu, Xi'an (CN)

(73) Assignee: Huawei Device Co., Ltd., Shenzhen (CN)

( * ) Notice: Subject to any disclaimer, the term of this patent is extended or adjusted under 35 U.S.C. 154(b) by 550 days.

(21) Appl. No.: 13/657,292

(22) Filed: Oct. 22, 2012

(65) Prior Publication Data
US 2013/0103966 A1 Apr. 25, 2013

(30) Foreign Application Priority Data
Oct. 21, 2011 (CN) .......................... 2011 1 0323858

(51) Int. Cl.
G06F 1/00 (2006.01)
G06F 1/26 (2006.01)
G06F 13/40 (2006.01)

(52) U.S. Cl.
CPC ............ G06F 1/266 (2013.01); G06F 13/4077 (2013.01)

(58) Field of Classification Search
None
See application file for complete search history.

(56) References Cited

U.S. PATENT DOCUMENTS

| | | | |
|---|---|---|---|
| 8,756,358 B2* | 6/2014 | Su et al. ...................... | 710/313 |
| 2008/0303486 A1* | 12/2008 | Kao et al. ...................... | 320/139 |
| 2010/0219790 A1 | 9/2010 | Chadbourne et al. | |
| 2010/0293302 A1 | 11/2010 | Fujii et al. | |
| 2011/0057604 A1 | 3/2011 | Capella | |
| 2013/0103966 A1 | 4/2013 | Liu | |
| 2013/0173836 A1 | 7/2013 | Li | |
| 2014/0051479 A1 | 2/2014 | Li et al. | |

FOREIGN PATENT DOCUMENTS

| | | |
|---|---|---|
| CN | 101030189 A | 9/2007 |
| CN | 101221546 A | 7/2008 |
| CN | 101702145 A | 5/2010 |
| CN | 101702146 A | 5/2010 |
| CN | 201550170 U | 8/2010 |

(Continued)

OTHER PUBLICATIONS

Office Action issued in corresponding European Patent Application No. 12189397.8, mailed Jul. 16, 2013, 4 pages.
USB Implementers Forum, Battery Charging Specification, Approved Class Specification Documents, U.S.A., The USB Implementers Forum Inc., Dec. 7, 2010, Revision 1.2, pp. 1 to 60, url: http://www.usb.org/developers/devclass_docs/BCv1.2_070312.zip 71 pages.

(Continued)

Primary Examiner — Kim Huynh
Assistant Examiner — Paul J Yen
(74) Attorney, Agent, or Firm — Brinks Gilson & Lione (57) ABSTRACT A method for selecting an internal circuit according to a USB interface status includes: connecting a first pin of a USB interface of a terminal to a power supply through a pull-up resistor, where the first pin is a D− or D+ pin; when detecting that an external USB device is inserted into the USB interface, detecting whether the level status of the first pin is high or low; if the level status is low, connecting the D− and D+ pins to corresponding pins of a USB data communication module of the terminal and controlling charging of the terminal according to a first policy; if the level status is high, determining whether the level statuses of the D− and D+ pins are consistent, and if consistent, controlling charging of the terminal according to a second policy; if inconsistent, controlling charging of the terminal according to a third policy.

10 Claims, 4 Drawing Sheets (56) References Cited

FOREIGN PATENT DOCUMENTS

| CN | 101840387 A | 9/2010 |
|----|-------------|--------|
| CN | 102202117 A | 9/2011 |
| CN | 103064489 A | 4/2013 |
| JP | 2009011153 A | 1/2009 |
| JP | 2009060717 A | 3/2009 |
| JP | 2010267221 A | 11/2010 |
| JP | 2011096238 A | 5/2011 |
| WO | WO 2008/001153 A1 | 1/2008 |

OTHER PUBLICATIONS

International Search Report issued in corresponding PCT Patent Application No. PCT/CN2012/083318, mailed Jan. 17, 2013.
Extended European Search Report issued in corresponding European Patent Application No. 12189397.8, mailed Jan. 2, 2013.
Sherman, "The Basics of USB Battery Charging: A Survival Guide" Tutorial, Maxim Integrated, Dec. 9, 2010.
Battery Charging Specification, rev. 1.1. USB Implementers Forum, Apr. 15, 2009. XP-002676116.

* cited by examiner

METHOD AND TERMINAL FOR SELECTING INTERNAL CIRCUIT ACCORDING TO USB INTERFACE STATUS

CROSS-REFERENCE TO RELATED APPLICATIONS

This application claims priority to Chinese Patent Application No. 201110323858.8, filed on Oct. 21, 2011, which is hereby incorporated by reference in its entirety.

FIELD OF THE INVENTION

The present invention relates to the field of electronic technologies, and in particular, to a method and terminal for selecting an internal circuit according to a USB interface status.

BACKGROUND OF THE INVENTION

Nowadays, more and more terminal devices such as mobile phones begin to use USB interfaces, and use one USB interface for both charging and data communication. Computer USB interfaces and power adapters (Adapters, including standard power adapters and non-standard power adapters) may serve as a power supply to provide currents for terminal devices to charge the terminal devices. However, because the charging currents provided by computer USB interfaces and power adapters are usually different, and the currents provided by power adapters vary according to adapter types, the type of external power supply inserted into a USB interface needs to be identified before a terminal is charged; otherwise, if charging currents are too large, the normal work of a computer or a power adapter is affected, and even the computer or the power adapter is damaged, and if the charging currents are too small, the charging time is prolonged, and therefore the functions of the power adapter capable of fast charging with large currents are not brought into full play.

When a user charges a terminal device with a power adapter through a USB interface, or charges the terminal device through a computer USB interface, or performs data communication through a computer USB interface, the terminal first detects the external USB device connected to the terminal and then performs charging or data communication accordingly.

At present, some processor chips can support the Battery Charging V1.1 and/or Battery Charging V1.2 protocol and have the function of detecting and identifying the power supply type of a USB interface. However, not all processor chips can support the preceding protocols. Sometimes, due to the overall design scheme of a terminal, an external USB interface is not directly a USB interface of a processor, but another interface of the processor such as an NFI or SDRAM interface which is converted by an interface conversion chip into a USB interface and made external. In this case, the power supply type cannot be identified directly through the processor.

In view of the disadvantages of the preceding technology, some semiconductor manufacturers have launched dedicated chips for identifying the type of USB power supply, but the costs are high.

Another solution is to directly connect other peripheral detection devices such as a comparator in parallel on the USB bus. However, the solution is only capable of detecting standard power adapters whose D+ and D− pins are shorted, and incapable of detecting non-standard power adapters with a not-connected D+ pin and a not-connected D− pin or without D+ and D− pins.

SUMMARY OF THE INVENTION

Embodiments of the present invention provide a method and terminal for selecting an internal circuit according to a USB interface status, which may identify different types of external USB device according to the USB interface status, without requiring the terminal to have a special processor.

In one aspect, an embodiment of the present invention provides a method for selecting an internal circuit according to a USB interface status, where:

a first pin of a USB interface of a terminal is connected to a power supply through a pull-up resistor, the first pin is a D− or D+ pin of the USB interface, and a resistance value of the pull-up resistor can ensure that a voltage value obtained by a to-ground pull-down resistor is a logic low level when the pull-up resistor and the to-ground pull-down resistor whose resistance value is approximately 15 KΩ±5% are connected in series to divide a voltage of the power supply; and the method includes:

when detecting that an external USB device is inserted into the USB interface of the terminal, detecting whether the level status of the first pin of the USB interface of the terminal is high or low;

if the level status of the first pin of the USB interface of the terminal is low, connecting D− and D+ pins of the USB interface of the terminal to corresponding pins of a USB data communication module of the terminal and controlling charging of the terminal according to a first policy, where the first policy is a corresponding policy applied when the external device is a data transmission device; and if the level status of the first pin of the USB interface of the terminal is high, determining whether level statuses of the D− and D+ pins of the USB interface of the terminal are consistent, and if consistent, controlling charging of the terminal according to a second policy; if inconsistent, controlling charging of the terminal according to a third policy, where the second policy is a corresponding policy applied when the external device is a standard power adapter, and the third policy is a corresponding policy applied when the external device is a non-standard power adapter.

In another aspect, an embodiment of the present invention provides a terminal for selecting an internal circuit according to a USB interface status, including:

a USB interface; which has a first pin and a second pin, where the first pin is a D− or D+ pin of the USB interface, and the second pin is a pin other than the first pin in the D− and D+ pins of the USB interface;

a USB data communication module, configured to perform data communication with an external USB device;

a pull-up resistor, with one end being connected to the first pin of the USB interface and the other end being connected to a power supply, where a resistance value of the pull-up resistor can ensure that a voltage value obtained by a to-ground pull-down resistor is a logic low level when the pull-up resistor and the to-ground pull-down resistor whose resistance value is approximately 15 KΩ±5% are connected in series to divide a voltage of the power supply;

a first detecting unit, configured to detect whether the external USB device is inserted into the USB interface;

a processor, configured to: when the first detecting unit detects that the external USB device is inserted into the USB interface, detect whether the level status of the first pin of the USB interface is high or low, and when the level status of the first pin of the USB interface is low, output a first control signal and control charging of the terminal according to a first policy; when the level status of the first pin of the USB interface is high, further determine whether level statuses of the D− and D+ pins of the USB interface of the terminal are consistent, and if consistent, control charging of the terminal according to a second policy; if inconsistent, control charging of the terminal according to a third policy; and a switching unit, configured to connect the D− and D+ pins of the USB interface to corresponding pins of the USB data communication module according to the first control signal, where the first policy is a corresponding policy applied when the external device is a data transmission device, the second policy is a corresponding policy applied when the external device is a standard power adapter, and the third policy is a corresponding policy applied when the external device is a non-standard power adapter.

Compared with the prior art, embodiments of the present invention have the following beneficial effects:

With the method and terminal provided by the embodiments of the present invention, the processor chip is not required to support the Battery Charging V1.1 and/or Battery Charging V1.2 protocol, and therefore the embodiments are applicable to various processor chips. No high-cost dedicated chip for identifying the type of USB power supply is required, and no comparator or other separate electronic components are required. The type of USB power supply is detected and identified through an interface of the processor, and no additional detecting or identifying module is required. Thereby, additional components and modules can be reduced, and the costs can be reduced.

BRIEF DESCRIPTION OF THE DRAWINGS

To make the technical solutions of the present invention clearer, the following briefly introduces accompanying drawings required for describing the embodiments of the present invention. Evidently, the accompanying drawings in the following description are merely some embodiments of the present invention. Persons of ordinary skill in the art may further derive other drawings according to these accompanying drawings without creative efforts.

DETAILED DESCRIPTION OF THE EMBODIMENTS

The following clearly and completely describes the technical solutions of the embodiments of the present invention with reference to the accompanying drawings in the embodiments of the present invention. Evidently, the described embodiments are only some embodiments of the present invention, rather than all embodiments of the present invention. All other embodiments obtained by persons of ordinary skill in the art based on the embodiments of the present invention without creative efforts shall fall within the protection scope of the present invention.

Figure 1:
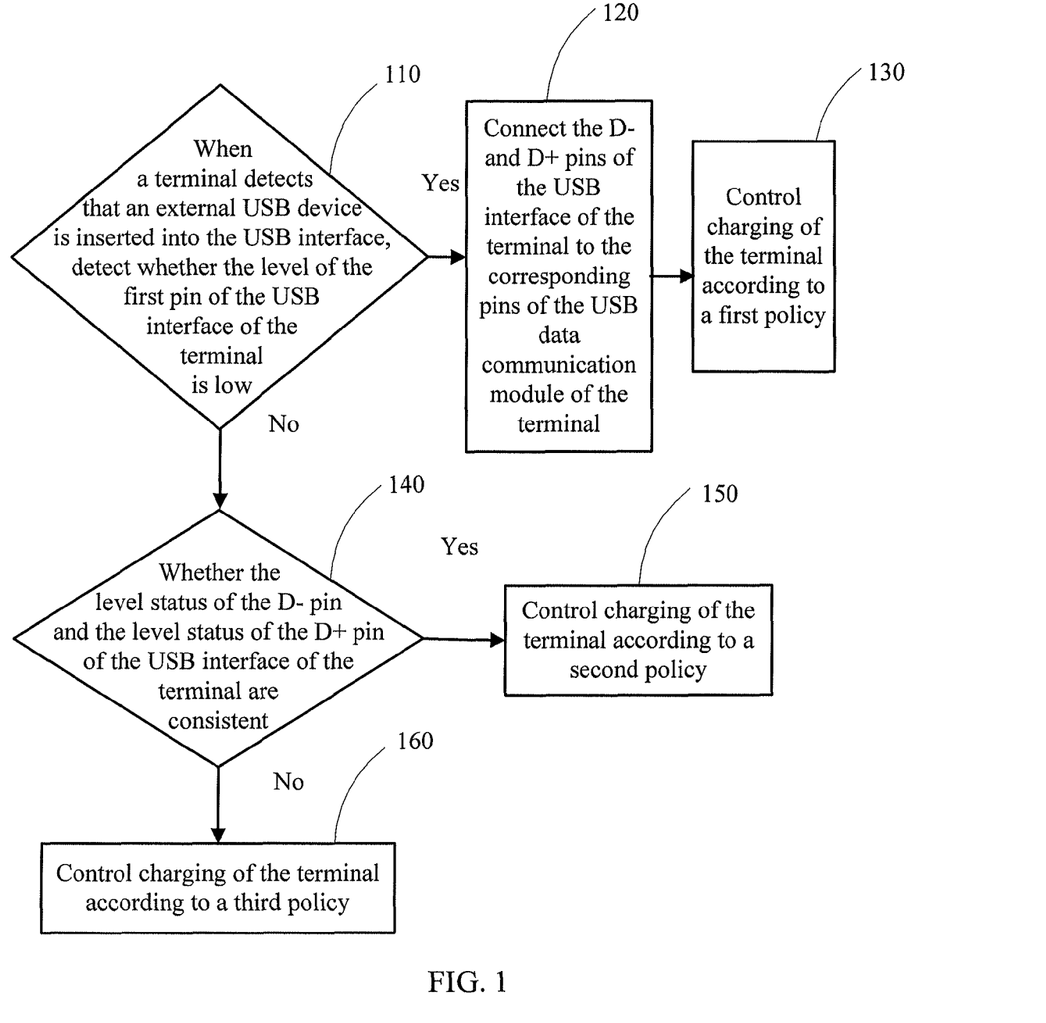
FIG. 1 is a flowchart of a method for selecting an internal circuit according to a USB interface status according to an embodiment of the present invention.

As shown in FIG. 1, in an embodiment of a method for selecting an internal circuit according to a USB interface status in the present invention, the first pin of a USB interface of a terminal is connected to a power supply through a pull-up resistor, the first pin is a D− or D+ pin of the USB interface, and the resistance value of the pull-up resistor can ensure that the voltage value obtained by a pull-down resistor is a logic low level when the pull-up resistor and the pull-down resistor one end of which is connected to the ground whose resistance value is approximately 15 KΩ±5% are connected in series to divide the voltage of the power supply, where one end of the pull-down resistor is connected to the ground. The resistance value of the pull-up resistor should meet the preceding condition because: if an external USB device is a data transmission device, according to a USB protocol, each of the D− and D+ pins of the USB interface of the data transmission device is connected to a to-ground pull-down resistor whose resistance value is approximately 15 KΩ±5%. The type of the USB interface of the terminal may be various types of USB interface defined by the USB protocol. The method may include the following steps:

110. When the terminal detects that an external USB device is inserted into a USB interface, detect whether the level of the first pin of the USB interface of the terminal is low; if the level of the first pin of the USB interface of the terminal is low, execute steps 120 and 130; otherwise, execute step 140.

Many methods may be used for the terminal to detect whether an external USB device is inserted into the USB interface. A common method is to detect, through an ADC pin of a processor, whether a USB_VBUS power cable has a voltage of approximately 5 V, or detect, through a GPIO (General Purpose Input/Output, that is, general purpose input/output) interface, whether the logic status of the USB_VBUS power cable is high. The method for the terminal to detect whether an external USB device is inserted into the USB interface may refer to the prior art, which is not limited by the present invention.

In step 110 of detecting the level of the first pin of the USB interface of the terminal, the pull-up resistor and the to-ground pull-down resistor whose resistance value is approximately 15 KΩ±5% divide the voltage of the power supply, where the to-ground pull-down resistor is connected to the D− or D+ pin of the USB interface of the data transmission device; the resistance value of the pull-up resistor can ensure that the voltage value obtained by a to-ground pull-down resistor is a logic low level when the pull-up resistor and the to-ground pull-down resistor whose resistance value is approximately 15 KΩ±5% divide the voltage of the power supply. Therefore, it is detected that the level of the first pin of the USB interface of the terminal is a low level. Therefore, when the resistance value of the pull-up resistor satisfies the condition, if it is detected that the level of the first pin of the USB interface of the terminal is a low level, it may be determined that the type of the external device is a data transmission device with a to-ground pull-down resistor whose resistance value is approximately 15 KΩ±5% connected to the D− and D+ pins of the USB interface. Therefore, step 120 is executed, that is, connecting the D− and D+ pins of the USB interface of the terminal to the corresponding pins of the USB data communication module of the terminal, which provides a channel for corresponding data transmission between the data transmission device and the terminal. When it is detected that the level of the first interface of the processor is a high level, it may be determined that the external device is not a data transmission device, and step 140 is executed. During detection, to make the detection result reliable, detection may be performed for many times in a period until several consecutive detection results are the same.

120. Connect the D− and D+ pins of the USB interface of the terminal to the corresponding pins of the USB data communication module of the terminal.

Specifically, with respect to a general USB data communication module, the D− and D+ pins may be connected to the USB_DM and USB_DP pins of the module.

130. Control charging of the terminal according to a first policy.

The first policy is a corresponding charging policy applied when the external device is a data transmission device; the data transmission device includes a USB HOST, for example, a USB interface of a computer or portable computer, a USB hub, or a USB router. The first policy may include: when the external device is a data transmission device, do not charge the terminal.

140. Determine whether the level statuses of the D− and D+ pins of the USB interface of the terminal are consistent, and if consistent, execute step 150; if inconsistent, execute step 160.

150. Control charging of the terminal according to a second policy.

The second policy is a corresponding policy applied when the external device is a standard power adapter.

The D+ and D− pins of the standard power adapter are shorted, and therefore, the level statuses of the two pins are consistent. Therefore, it may be detected that the level status of the D− pin and the level status of the D+ pin of the USB interface of the terminal are consistent.

160. Control charging of the terminal according to a third policy.

The third policy is a corresponding policy applied when the external device is a non-standard power adapter.

The D+ and D− pins of the non-standard power adapter are not shorted, and therefore, the level statuses of the two pins are inconsistent. Therefore, it may be detected that the level status of the D− pin and the level status of the D+ pin of the USB interface of the terminal are inconsistent. In the embodiment of the present invention, the non-standard power adapter may be a power adapter with a not-connected D+ pin and a not-connected D− pin or without D+ and D− pins.

With the method provided by the embodiment of the present invention, different types of external USB device may be identified according to the USB interface status, without requiring the terminal to have a special processor, and the policy corresponding to the type of external USB device is used to charge the terminal.

With the method provided by the embodiment of the present invention, a processor chip is not required to support the Battery Charging V1.1 and/or Battery Charging V1.2 protocol, and therefore the embodiment is applicable to various processor chips. The type of the USB interface of the terminal is not limited, and therefore the embodiment is applicable to terminals of all types of USB interface. No high-cost dedicated chip for identifying the type of USB power supply is required, and no comparator or other separate electronic components are required. The type of USB power supply is detected and identified through an interface of the processor, and no additional detecting or identifying module is required. Thereby, additional components and modules can be reduced, and the costs can be reduced.

Figure 2:
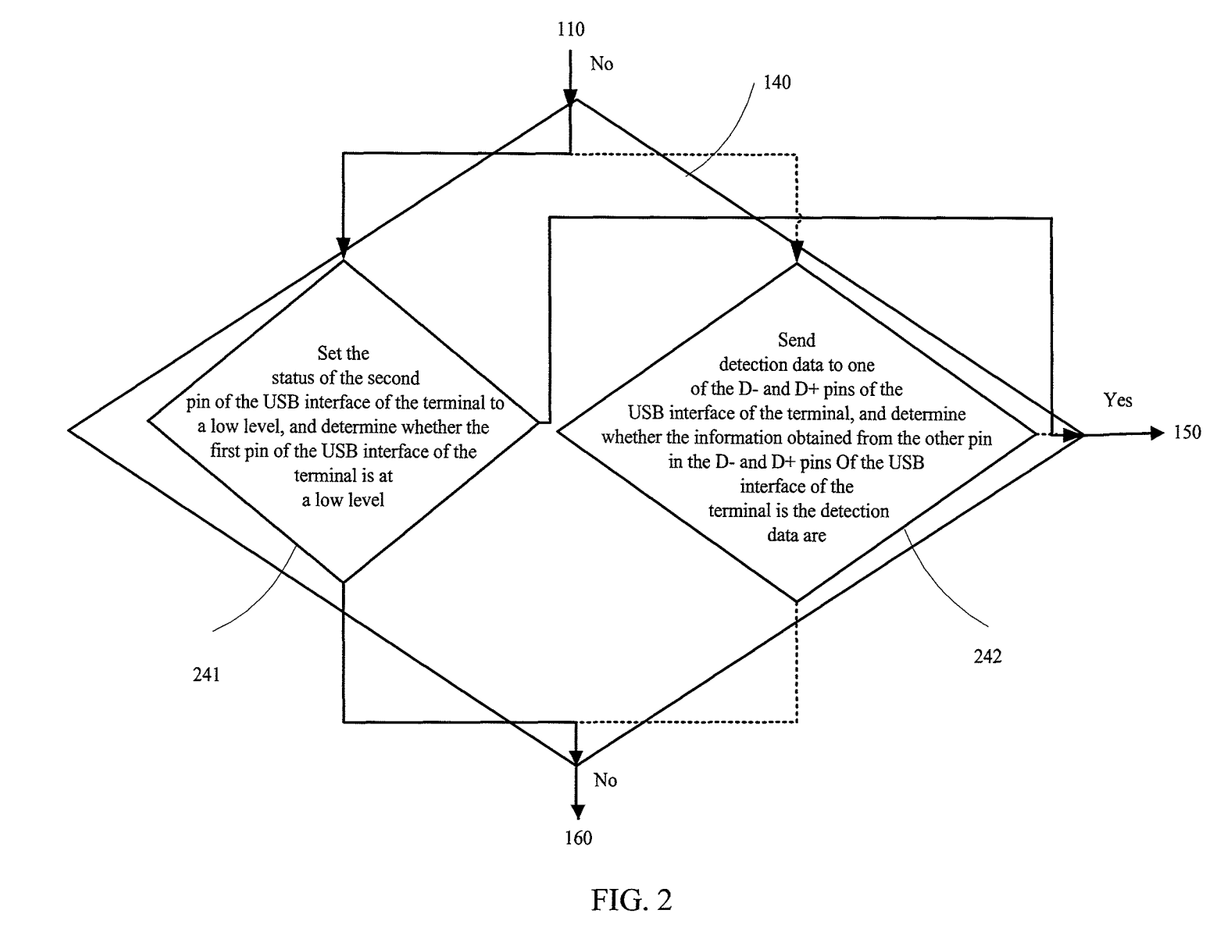
FIG. 2 is a flowchart of another method for selecting an internal circuit according to a USB interface status according to an embodiment of the present invention.

As shown in FIG. 2, in an embodiment of a method for selecting an internal circuit according to the USB interface status in the present invention, step 140 may be implemented by executing step 241 or step 242. Step 241 is specifically as follows:

241. Set the status of the second pin of the USB interface of the terminal to a low level, and determine whether the first pin of the USB interface of the terminal is at a low level. If the first pin of the USB interface of the terminal is at a low level, the level status of the D− pin and the level status of the D+ pin of the USB interface of the terminal are consistent, and step 150 is executed; otherwise, step 160 is executed.

In step 110, when it is detected that the level of the first pin of the USB interface of the terminal is a high level, step 241 is executed. In step 241, if it is directly determined that the level status of the D− pin and the level status of the D+ pin of the USB interface of the terminal are consistent when it is detected that the level of the second pin of the USB interface of the terminal is a high level, a misjudgment may occur. That is because if the external device is a power adapter with a not-connected D+ pin and a not-connected D− pin, the detection result is not sure when the status of the second pin of the USB interface of the terminal is directly detected. Due to the effect of the internal circuit, the detection result may be a high level or may be a low level. Therefore, a misjudgment may occur, making the detection and determination results be incorrect. Therefore, in an embodiment of the present invention, in step 241, the status of the second pin of the USB interface of the terminal is set to a low level, and then the level of the first pin of the USB interface of the terminal is determined; before the second pin of the USB interface of the terminal is set to a low level, the first pin of the USB interface of the terminal is at a high level, and in this case, if the level of the first pin of the USB interface of the terminal is a low level, the level of the first pin of the USB interface of the terminal, which is affected by the second pin, is consistent with the level of the second pin. Therefore, it may be correctly determined that the level status of the D− pin and the level status of the D+ pin of the USB interface of the terminal are consistent, and in this case, it may be correctly determined that the external device is a standard power adapter whose D+ and D− pins are shorted; in this case, if the level of the first pin of the USB interface of the terminal is a high level and is the same as the original status before the second pin of the USB interface of the terminal is set to a low level and does not change, the first pin of the USB interface of the terminal is not affected by the second pin of the USB interface of the terminal. Therefore, it may be correctly determined that the level status of the D− pin and the level status of the D+ pin of the USB interface of the terminal are inconsistent, and it may be further determined that the external device is a non-standard power adapter. The detection method is reasonable, and no misjudgment occurs, which improves the accuracy of a detection result.

Or, in an embodiment of the present invention, step 140 may also be step 242:

242. Send detection data to one of the first pin and the second pin of the USB interface of the terminal, and determine whether the information obtained from the other pin of the first pin and the second pin of the USB interface of the terminal is the detection data. If the information obtained from the other pin of the first pin and the second pin of the USB interface of the terminal is the detection data, the level status of the D− pin and the level status of the D+ pin of the USB interface of the terminal are consistent, and step 150 is executed; if the information is not the detection data, step 160 is executed.

When it is detected that the information obtained from the other pin of the first pin and the second pin of the USB interface of the terminal is the detection data, it is known that the D− and D+ pins of the USB interface of the terminal are electrically connected, and therefore the level statuses of the D− and D+ pins are consistent.

In this embodiment, the method for detecting whether the level status of the D− pin and the level status of the D+ pin of the USB interface of the terminal are consistent does not require a comparator or other separate electronic components. The detection and determination about whether the level status of the D− pin and the level status of the D+ pin of the USB interface of the terminal are consistent can be implemented at low costs, and the detection method is reasonable, which decreases misjudgments and improves the accuracy of a detection result.

In an embodiment of the method for selecting an internal circuit according to the USB interface status in the present invention, the first pin and the second pin of the USB interface of the terminal, in an initial state, are connected to the first interface and the second interface of a processor of the terminal, respectively. In step 110, the detecting whether the level status of the first pin of the USB interface of the terminal is high or low may be: detecting whether the level status of the first interface of the processor of the terminal is high or low. Step 241 may be: setting the status of the second interface of the processor of the terminal to a low level, determining whether the first interface of the processor of the terminal is at a low level, and if so, executing step 150; otherwise, executing step 160. Step 242 may be: sending detection data to one of the first interface and the second interface of the processor of the terminal, and determining whether the information obtained from the other interface of the first interface and the second interface of the processor of the terminal is the detection data, and if so, executing step 150; if the information is not the detection data, executing step 160.

In an embodiment of a method for selecting an internal circuit according to a USB interface status in the present invention, the first pin and the second pin of the USB interface of the terminal are connected to the first pin and the second pin of an electronic switch module, respectively; the third pin and the fourth pin of the electronic switch module are connected to the first interface and the second interface of the processor of the terminal, respectively; the first pin and the second pin of the electronic switch module, in the initial state, are connected to the third pin and the fourth pin of the electronic switch module, respectively; the pull-up resistor is electrically connected to the third pin of the electronic switch module and the first interface of the processor of the terminal, so that the first pin of the USB interface of the terminal, in the initial state, is electrically connected to the pull-up resistor; and the fifth pin and the sixth pin of the electronic switch module are connected to corresponding pins of the USB data communication module of the terminal. Step 120 may be as follows: The electronic switch module, under control of a first control signal, connects the first pin and the second pin of the electronic switch module to the fifth pin and the sixth pin of the electronic switch module, respectively, so that the D− and D+ pins of the USB interface of the terminal are electrically connected to the corresponding pins of the USB data communication module of the terminal.

In the embodiment of the present invention, the first pin and the second pin of the electronic switch module, in the initial state, are connected to the third pin and the fourth pin of the electronic switch module, respectively, so that the first pin and the second pin of the USB interface of the terminal, in the initial state, are electrically connected to the first interface and the second interface of the processor of the terminal, respectively. The electronic switch module, under control of the first control signal, connects the D− and D+ pins of the USB interface of the terminal electrically to corresponding pins of the USB data communication module of the terminal. The switching and connecting functions of the electronic switch module implement connections of different internal circuits. The pull-up resistor is electrically connected to the third pin of the electronic switch module and the first interface of the processor of the terminal, and does not interfere with the detection result of the level of the first pin of the USB interface of the terminal, thus reducing interference with the circuit and improving the accuracy of detection.

In an embodiment of a method for selecting an internal circuit according to a USB interface status in the present invention, step 120 may be as follows: The processor of the terminal sends a first control signal to a control pin of the electronic switch module through a third interface, and connects the first pin and the second pin of the electronic switch module to the fifth pin and the sixth pin of the electronic switch module, respectively, so that the D− and D+ pins of the USB interface of the terminal are electrically connected to corresponding pins of the USB data communication module of the terminal.

In an embodiment of a method for selecting an internal circuit according to a USB interface status in the present invention, step 120 may also be as follows: The processor of the terminal sends a first control signal to a control signal module through a third interface, and the control signal module transfers the first control signal to a control pin of the electronic switch module; the electronic switch module connects the first pin and the second pin of the electronic switch module to the fifth pin and the sixth pin of the electronic switch module according to the first control signal, respectively, so that the D− and D+ pins of the USB interface of the terminal are electrically connected to corresponding pins of the USB data communication module of the terminal.

The connecting the first pin and the second pin of the electronic switch module, in the initial state, to the third pin and the fourth pin of the electronic switch module, respectively may be as follows: The electronic switch module, under control of an initial control signal output by the control signal module, connects the first pin and the second pin of the electronic switch module to the third pin and the fourth pin of the electronic switch module, respectively, where the initial control signal is output by the control signal module and sent to the control pin of the electronic switch module.

In the embodiment of the present invention, the control signal module provides an initial control signal to the electronic switch module, so that the first pin and the second pin of the electronic switch module, in the initial state, are connected to the third pin and the fourth pin of the electronic switch module, respectively, thus implementing an initial connection of circuits; this does not require the electronic switch module, in the initial state, to have the connection status of connecting the first pin and the second pin to the third pin and the fourth pin of the electronic switch module, respectively, reduces complexity of the electronic switch module, and reduces requirements on circuit components.

The electronic switch module in the above embodiment may be a USB analog switch or other switch components or chips having the switching and connecting functions. When the electronic switch module is a USB analog switch, due to good compatibility between the USB analog switch and the USB interface, the quality and communication rate of the USB signal can be ensured, and the circuit compatibility is good.

Further, the first, second, and third interfaces of the processor of the terminal in the above embodiment may be GPIO (General Purpose Input/Output, general purpose input/output) interfaces of the processor of the terminal, or may also be other interfaces of the processor of the terminal. When they are GPIO interfaces of the processor of the terminal, it is convenient for the processor of the terminal to detect and control the interfaces.

The above processor of the terminal may be any processor on the terminal; the processor, no matter whether it supports the Battery Charging V1.1 and/or Battery Charging V1.2 protocol, may identify the type of external USB device, and control charging of the terminal according to a policy corresponding to the type of external USB device. Therefore, no high-cost dedicated chip for identifying the type of USB power supply is required, which reduces the costs and is applicable to various processors. The processor performs related detection and control through the GPIO interface included in the processor, and no additional detecting or identifying module is required, and no comparator or other separate electronic components are required, further reducing the costs.

Figure 3:
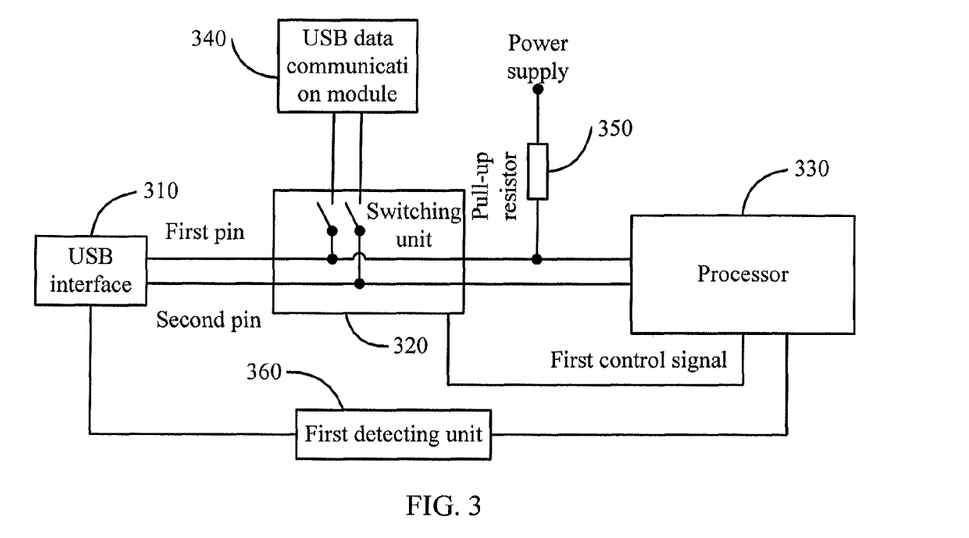
FIG. 3 is a flowchart of another method for selecting an internal circuit according to a USB interface status according to an embodiment of the present invention.

An embodiment of the present invention provides a terminal for selecting an internal circuit according to a USB interface status. FIG. 3 shows an embodiment of a terminal provided by the present invention, and in this embodiment, the terminal includes:

a USB interface 310, which has a first pin and a second pin, where the first pin is a D− or D+ pin of the USB interface, and the second pin is a pin other than the first pin in the D− and D+ pins of the USB interface, where the type of the USB interface may be various types of USB interface defined by the USB protocol;

a USB data communication module 340, configured to perform data communication with an external USB device;

a pull-up resistor 350, with one end being connected to the first pin of the USB interface 310 and the other end being connected to a power supply, where the resistance value of the pull-up resistor 350 can ensure that the voltage value obtained by a to-ground pull-down resistor is a logic low level when the pull-up resistor and the to-ground pull-down resistor whose resistance value is approximately 15 KΩ±5% are connected in series to divide the voltage of the power supply, and the resistance value of the pull-up resistor should meet the preceding condition because if the external USB device is a data transmission device, according to the USB protocol, each of the D− and D+ pins of the USB interface of the data transmission device is connected to a to-ground pull-down resistor whose resistance value is approximately 15 KΩ±5%;

a first detecting unit 360, configured to detect whether the external USB device is inserted into the USB interface 310;

a processor 330, configured to: when the first detecting unit 360 detects that the external USB device is inserted into the USB interface, detect whether the level status of the first pin of the USB interface 310 is high or low, and when the level status of the first pin of the USB interface 310 is low, output a first control signal and control charging of the terminal according to a first policy; when the level status of the first pin of the USB interface is high, further determine whether the level statuses of the D− and D+ pins of the USB interface 310 of the terminal are consistent, and if consistent, control charging of the terminal according to a second policy; if inconsistent, control charging of the terminal according to a third policy, where the first policy is a corresponding policy applied when the external device is a data transmission device, the second policy is a corresponding policy applied when the external device is a standard power adapter, and the third policy is a corresponding policy applied when the external device is a non-standard power adapter; and a switching unit 320, configured to connect the D− and D+ pins of the USB interface 310 to corresponding pins of the USB data communication module 340 according to the first control signal. Specifically, with respect to a general USB data communication module, the D− and D+ pins may be connected to the USB_DM and USB_DP pins of the module.

Figure 4:
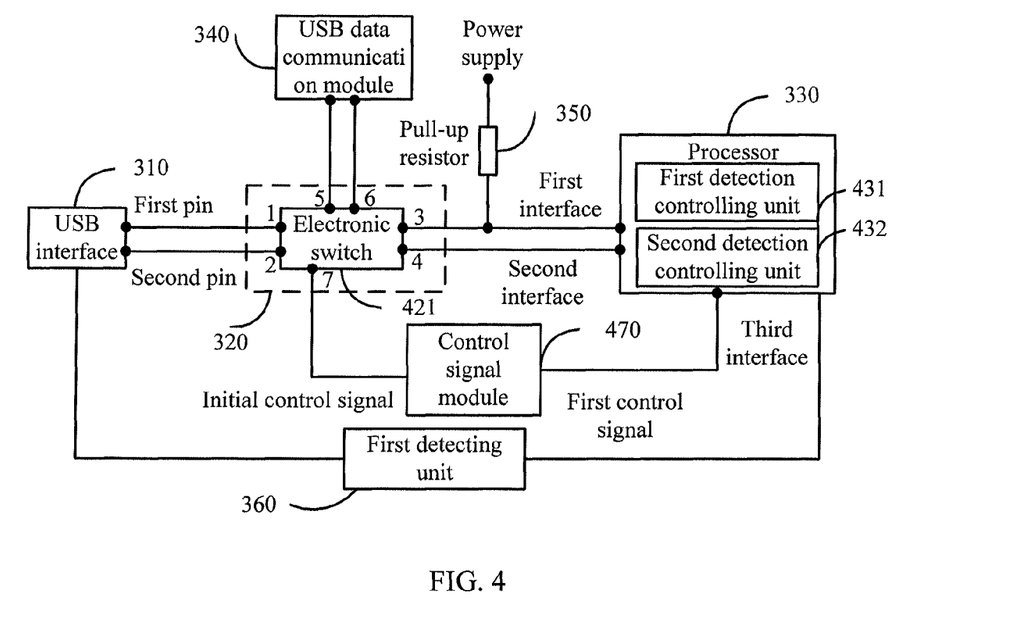
FIG. 4 is a flowchart of another method for selecting an internal circuit according to a USB interface status according to an embodiment of the present invention.

In an embodiment of the terminal provided by the present invention, the processor 330 may include:

a first detection controlling unit 431, configured to: when the first detecting unit 360 detects that the external USB device is inserted into the USB interface 310, detect whether the level status of the first pin of the USB interface 310 is high or low, and when the level status of the first pin of the USB interface is low, output the first control signal and control charging of the terminal according to the first policy, where the first policy is a corresponding charging policy applied when the external device is a data transmission device, the data transmission device includes a USB HOST, for example, a USB interface of a computer or portable computer, a USB hub, or a USB router, and the first policy may include: when the external device is a data transmission device, do not charge the terminal; and a second detection controlling unit 432, configured to: when the first detection controlling unit 431 detects that the level of the first pin of the USB interface 310 is a high level, determine whether the level statuses of the D− and D+ pins of the USB interface 310 are consistent, and if consistent, control charging of the terminal according to the second policy, or if inconsistent, control charging of the terminal according to the third policy.

In an embodiment of the terminal provided by the present invention, the second detection controlling unit 432 is specifically configured to: when the first detection controlling unit 431 detects that the level of the first pin of the USB interface is a high level, set the level of the second pin of the USB interface 310 of the terminal to a low level, determine whether the level of the first pin of the USB interface 310 is a low level, and if the level of the first pin of the USB interface is a low level, determine that the level status of the D− pin and the level status of the D+ pin of the USB interface 310 are consistent, and control charging of the terminal according to the second policy; if the level of the first pin of the USB interface is not a low level, determine that the level status of the D− pin and the level status of the D+ pin of the USB interface 310 are inconsistent, and control charging of the terminal according to the third policy.

In an embodiment of the terminal provided by the present invention, the second detection controlling unit 432 is specifically configured to: when the first detection controlling unit 431 detects that the level of the first pin of the USB interface 310 is a high level, send detection data to one of the D− and D+ pins of the USB interface 310, determine whether the information obtained from the other pin in the D− and D+ pins of the USB interface 310 is the detection data, and if so, determine that the level status of the D− pin and the level status of the D+ pin of the USB interface are consistent, and control charging of the terminal according to the second policy; if the information is not the detection data, determine that the level status of the D− pin and the level status of the D+ pin of the USB interface 310 are inconsistent, and control charging of the terminal according to the third policy.

In an embodiment of the terminal provided by the present invention, the processor 330 further has a first interface and a second interface, and the first pin and the second pin of the USB interface 310, in an initial state, are connected to the first interface and the second interface of the processor 330, respectively.

The first detection controlling unit 431 is specifically configured to: when the first detecting unit 360 detects that the external USB device is inserted into the USB interface 310, detect whether the level status of the first interface of the processor 330 is high or low, and when the level status of the first interface of the processor 330 is low, output the first control signal and control charging of the terminal according to the first policy; and the second detection controlling unit 432 is specifically configured to: when the first detection controlling unit 431 detects that the level of the first interface of the processor 330 is a high level, set the level of the second interface of the processor 330 to a low level, determine whether the level of the first interface of the processor 330 is a low level, and if the level of the first interface of the processor 330 is a low level, determine that the level status of the D− pin and the level status of the D+ pin of the USB interface 310 are consistent, and control charging of the terminal according to the second policy; if the level of the first interface of the processor 330 is not a low level, determine that the level status of the D− pin and the level status of the D+ pin of the USB interface 310 are inconsistent, and control charging of the terminal according to the third policy; or the second detection controlling unit 432 is specifically configured to: when the first detection controlling unit 431 detects that the level of the first interface of the processor 330 is a high level, send detection data to one of the first and second interfaces of the processor 330, determine whether the information obtained from the other interface of the first and second interfaces of the processor 330 is the detection data, and if so, determine that the level status of the D− pin and the level status of the D+ pin of the USB interface 310 are consistent, and control charging of the terminal according to the second policy; if the information is not the detection data, determine that the level status of the D− pin and the level status of the D+ pin of the USB interface 310 are inconsistent, and control charging of the terminal according to the third policy.

In this embodiment, the first and second interfaces of the processor 330 are detected and controlled, without requiring a comparator or other separate electronic components; the detection and determination about whether the level status of the D− pin and the level status of the D+ pin of the USB interface of the terminal are consistent can be implemented at low costs, and the detection method is reasonable, which decreases misjudgments and improves the accuracy of a detection result. The specific description about how to improve accuracy of a detection result is the same as the description of the counterpart in the foregoing method embodiment, and is not repeated herein.

In an embodiment of the terminal provided by the present invention, the switching unit 320 may be an electronic switch 421, and have first, second, third, fourth, fifth, and sixth pins; the first and second pins of the electronic switch 421 are electrically connected to the first and second pins of the USB interface 310, respectively; the third and fourth pins of the electronic switch 421 are electrically connected to the first and second interfaces of the processor 330, respectively; the fifth and sixth pins of the electronic switch 421 are connected to corresponding pins of the USB data communication module 340; the first and second pins of the electronic switch 421, in the initial state, are electrically connected to the third and fourth pins of the electronic switch 421, respectively, so that the first pin and the second pin of the USB interface 310 are electrically connected to the first interface and the second interface of the processor 330, respectively; the pull-up resistor 350 is electrically connected to the third pin of the electronic switch 421 and the first interface of the processor 330, so that the first pin of the USB interface of the terminal, in the initial state, is electrically connected to the pull-up resistor.

The electronic switch 421 is specifically configured to connect, according to the first control signal, the first pin and the second pin of the electronic switch 421 to the fifth pin and the sixth pin of the electronic switch 421, respectively, so that the D− and D+ pins of the USB interface 310 of the terminal are electrically connected to the corresponding pins of the USB data communication module 340 of the terminal.

In this embodiment, the pull-up resistor 350 is electrically connected to the third pin of the electronic switch 421 and the first interface of the processor 330, and does not interfere with the detection result of the level of the first pin of the USB interface 310 of the terminal, thus reducing interference with the circuit and improving the accuracy of detection.

In an embodiment of the terminal provided by the present invention, the processor 330 further has a third interface; the electronic switch 421 further has a control pin, namely, a seventh pin; and the first detection controlling unit 431 is specifically configured to: when the first detecting unit 360 detects that the external USB device is inserted into the USB interface 310, detect whether the level status of the first interface of the processor 330 is high or low, and when the level status of the first interface of the processor 330 is low, output the first control signal through the third interface of the processor 330 and send the first control signal to the control pin of the electronic switch 421, and control charging of the terminal according to the first policy.

In an embodiment of the terminal provided by the present invention, as shown in FIG. 4, the processor 330 further has a third interface; the electronic switch 421 further has a control pin; and the terminal further includes a control signal module 470, configured to: in an initial state, generate an initial control signal and send the initial control signal to the control pin of the electronic switch 421, and when the first detection controlling unit 431 outputs the first control signal, receive the first control signal from the third interface of the processor 330 and send the first control signal to the control pin of the electronic switch 421; and the electronic switch 421 is specifically configured to: receive, through the control pin, the initial control signal sent by the control signal module 470, and connect the first pin and the second pin of the electronic switch 470 to the third pin and the fourth pin of the electronic switch 470 according to the initial control signal, respectively; and receive the first control signal through the control pin, and connect the first pin and the second pin of the electronic switch 470 to the fifth pin and the sixth pin of the electronic switch 470 according to the first control signal, so that the D− and D+ pins of the USB interface 310 of the terminal are electrically connected to the corresponding pins of the USB data communication module 340 of the terminal.

In this embodiment, the control signal module 470 provides an initial control signal to the electronic switch 421, so that the first pin and the second pin of the electronic switch 421, in the initial state, are connected to the third pin and the fourth pin of an electronic switch module, respectively, thus implementing an initial connection of circuits; this does not require the electronic switch 421, in the initial state, to have the connection status of connecting the first pin and the second pin to the third pin and the fourth pin of the electronic switch module, respectively, reduces complexity of the electronic switch 421, and reduces requirements on circuit components.

The electronic switch 421 in the above embodiment may be a USB analog switch or other switch components or chips having the switching and connecting functions. When the electronic switch 421 is a USB analog switch, due to good compatibility between the USB analog switch and the USB interface, the quality and communication rate of the USB signal can be ensured, and the circuit compatibility is good.

Further, the first, second, and third interfaces of the above processor of the terminal 330 may be GPIO (General Purpose Input/Output, general purpose input/output) interfaces of the processor of the terminal, or may also be other interfaces of the processor of the terminal. When they are GPIO interfaces of the processor of the terminal, it is convenient for the processor of the terminal to detect and control the interfaces.

The above processor of the terminal 330 may be any processor on the terminal; the processor, no matter whether it supports the Battery Charging V1.1 and/or Battery Charging V1.2 protocol, may identify the type of external USB device, and control charging of the terminal according to a policy corresponding to the type of external USB device. Therefore, no high-cost dedicated chip for identifying the type of USB power supply is required, which reduces the costs and is applicable to various processors. The processor 330 performs related detection and control through the GPIO interface included in the processor, and no additional detecting or identifying module is required, and no comparator or other separate electronic components are required, further reducing the costs.

Figure 5:
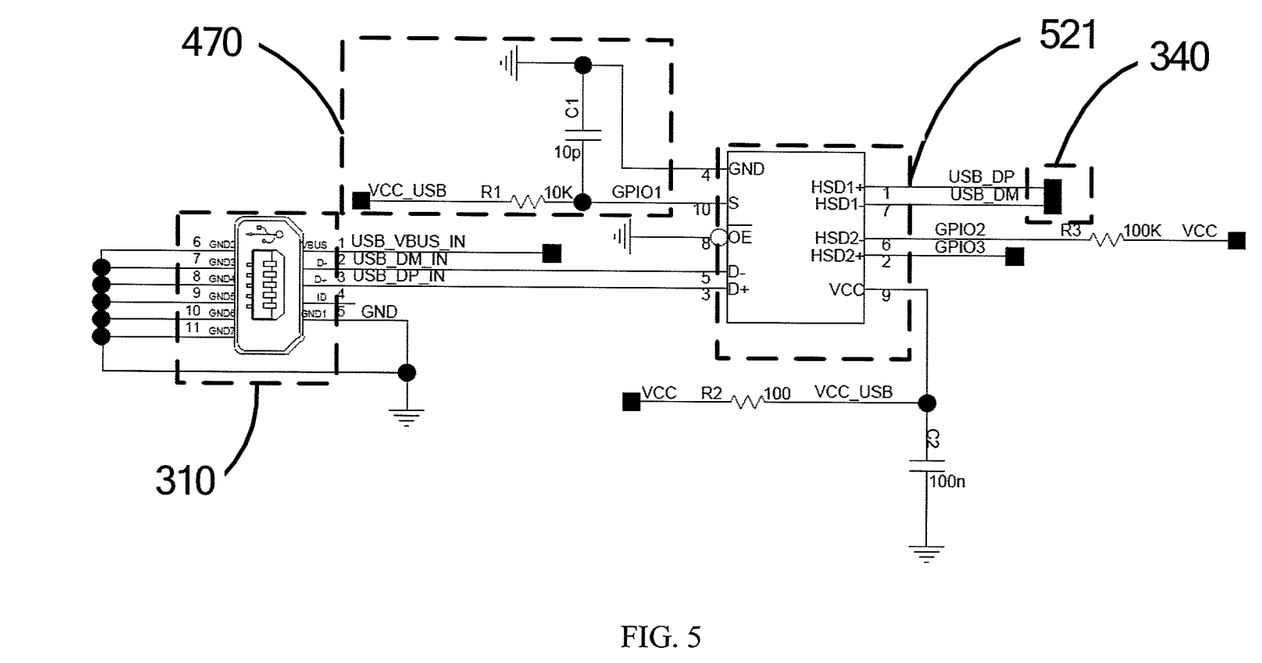
FIG. 5 is a schematic diagram illustrating an internal circuit structure of a terminal for selecting an internal circuit according to a USB interface status according to an embodiment of the present invention.

FIG. 5 is a schematic diagram illustrating an internal circuit structure of a terminal for selecting an internal circuit according to a USB interface status according to an embodiment of the present invention. The following describes in detail the work principle of the terminal for selecting an internal circuit according to a USB interface status by taking this terminal as an example.

In this embodiment, the electronic switch 421 is a USB analog switch 521; the first pin of the USB interface 310 is a D− pin.

In FIG. 5, the D− pin of the USB interface 310 is USB_DM_IN, and the D+ pin is USB_DP_IN; the first to sixth pins of the electronic switch 421 may be pins 5, 3, 6, 2, 7, and 1 of the USB analog switch 521 respectively, namely, D−, D+, HSD2−, HSD2+, HSD1−, and HSD1+, and the control pin of the electronic switch 421 may be pin 10 of the USB analog switch 521, namely, pin S; the processor 330 may be any processor on the terminal, and the first, second, and third interfaces of the processor 330 may be GPIO interfaces of the processor 330, and may be GPIO2, GPIO3, and GPIO1 interfaces; the pull-up resistor 350 pulled up to the power supply is an R3 resistor connected to the power supply VCC, and its resistance value is 100 KΩ, which can ensure that a voltage value obtained by a to-ground pull-down resistor is a logic low level when the pull-up resistor and the to-ground pull-down resistor whose resistance value is approximately 15 KΩ±5% divide the voltage of the power supply; the control signal module 470 includes a resistor R1 pulled up to the VCC_USB power supply, and a capacitor C1 connected to the ground.

In FIG. 5, the D− and D+ pins of the USB interface 310 are connected to pins D− and D+ of the USB analog switch 521, respectively. The pin $\overline{OE}$ of the USB analog switch 521, namely, pin 8, is an enable pin, and it is valid when the level is low; the pin is connected to the ground so that the pin is at the low level and in the valid state. Pin S of the USB analog switch 521 is a control pin; when pin S is at a high level, the D− and D+ pins of the USB analog switch 521 are electrically connected to the HSD2− and HSD2+ pins, respectively; when the pin S is at a low level, the D− and D+ pins of the USB analog switch 521 may be electrically connected to the HSD1− and HSD1+ pins, respectively. The pin S of the USB analog switch 521 is connected to the GPIO1 interfaces of the control signal module 470 and the processor 330. The HSD2− and HSD2+ pins of the USB analog switch 521 are connected to the GPIO2 and GPIO3 interfaces of the processor 330, respectively, and the GPIO2 interface of the processor 330 is pulled up to the power supply VCC through the pull-up resistor R3. The HSD1− and HSD1+ pins of the USB analog switch 521 are connected to the pins USB_DM and USB_DP of the USB data line of the USB data communication module 340, respectively. In the initial state, the control signal module 470 can provide an initial high level control signal to the pin S of the USB analog switch 521 to set the pin S to a high level, so that the D− and D+ pins of the USB analog switch 521 are electrically connected to the HSD2− and HSD2+ pins, respectively. Therefore, in the initial state, the D− and D+ pins of the USB interface 310 can be electrically connected to the GPIO2 and GPIO3 interfaces of the processor 330, respectively, and the D− pin of the USB interface 310, in the initial state, can be electrically connected to the pull-up resistor R3, that is, the first pin of the USB interface 310, in the initial state, is electrically connected to the pull-up resistor R3

The above connection relationships between the USB analog switch 521 and the processor 330 and between the USB analog switch 521 and the USB data communication module 340 may also be as follows: The pins HSD2− and HSD2+ of the USB analog switch 521 are connected to the pins USB_DM and USB_DP of the USB data line of the USB data communication module 340, respectively; the pins HSD1− and HSD1+ of the USB analog switch 521 are connected to the GPIO2 and GPIO3 interfaces of the processor 330, respectively. However, the relationships require some changes to the control signal module 470: pulling down the resistor R1 of the control signal module 470 to the ground rather than pulling up the resistor R1 of the control signal module 470 to the VCC_USB power supply. Therefore, in the initial state, the control signal module 470 may output a low level control signal to the pin S of the USB analog switch 521 to set the pin S to a low level, so that the D− and D+ pins of the USB analog switch 521 are electrically connected to the HSD1− and HSD1+ pins, respectively. Therefore, in the initial state, the D− and D+ pins of the USB interface 310 can be electrically connected to the GPIO2 and GPIO3 interfaces of the processor 330, respectively, and the D− pin of the USB interface 310, in the initial state, can be electrically connected to the pull-up resistor R3, that is, the first pin of the USB interface 310, in the initial state, is electrically connected to the pull-up resistor R3.

In the embodiment shown in FIG. 5, the first pin of the USB interface 310 is a D− pin, and the first pin of the USB interface 310 may also be a D+ pin. When the first pin of the USB interface 310 is a D+ pin, to enable the first pin of the USB interface 310, in the initial state, to be electrically connected to the pull-up resistor R3, the connection of the pull-up resistor R3 needs to be changed so that the pull-up resistor R3 is connected to the GPIO3 interface of the processor 330 and is connected to the power supply VCC; other circuit connections remain unchanged.

The above connection in the initial state enables subsequent smooth detection of the status of the D− and D+ pins of the USB interface 310 by detecting and controlling the GPIO2 and GPIO3 interfaces of the processor 330.

In FIG. 5, in the initial state, the USB analog switch 521, under control of the control signal at the initial high level provided by the control signal module 470, electrically connects the D− and D+ pins to the HSD2− and HSD2+ pins of the USB analog switch 521, respectively. As a result, in the initial state, the D− and D+ pins of the USB interface 310 are electrically connected to the GPIO2 and GPIO3 interfaces of the processor 330, respectively.

When the terminal detects that an external USB device is inserted into the USB interface 310, the terminal detects whether the level status of the GPIO2 interface of the processor 330 is high or low:

If the level status of the GPIO2 interface of the processor 330 is low, according to the foregoing analysis, it may be determined that the external device type is a data transmission device with a to-ground pull-down resistor whose resistance value is approximately 15 KΩ±5% connected to the D− and D+ pins of the USB interface. Therefore, the processor 330 sends a low level control signal to the pin S of the USB analog switch 521 through a GPIO3 interface to set the pin S to a low level, thus further controlling the USB analog switch 521 to connect the D− and D+ pins to the HSD1− and HSD1+ pins. Thereby, the D− and D+ pins of the USB interface 310 of the terminal are connected to the pins USB_DM and USB_DP of the USB data line of the USB data communication module 340, which provides a channel for data transmission between the external data transmission device and the terminal. Meanwhile, charging of the terminal is controlled according to the corresponding policy applied when the external device is a data transmission device.

If the level status of the GPIO2 interface of the processor 330 is high, the type of the external device is a power adapter, and specifically whether it is a standard or non-standard power adapter needs to be further determined. The D+ and D− pins of the standard power adapter are shorted. For the non-standard power adapter, D+ and D− pins may be not connected, or no D+ and D− pins are available. The type of the power adapter of the external device may be determined by determining whether the level statuses of the D− and D+ pins of the USB interface 310 of the terminal are consistent. If the level status of the D− pin and the level status of the D+ pin of the USB interface 310 of the terminal are consistent, it may be determined that the external device is a standard power adapter whose D+ and D− pins are shorted; if inconsistent, it may be determined that the external device is a non-standard power adapter. The process of determining whether the level status of the D− pin and the level status of the D+ pin of the USB interface 310 of the terminal are consistent is as follows:

The processor 330 first sets the GPIO3 interface to a low level, then detects the level of the GPIO2 interface, and if it is a low level, determines that the level status of the GPIO3 interface and the level status of the GPIO2 interface are consistent, and thus may learn that the level status of the D− pin and the level status of the D+ pin of the USB interface 310 of the terminal are consistent; if the processor 330 detects that the level of the GPIO2 interface is still the original high level, the processor 330 may learn that the level status of the D− pin and the level status of the D+ pin of the USB interface 310 of the terminal are inconsistent.

After it is determined that the type of the external power adapter is a standard or non-standard power adapter, charging of the terminal is controlled according to the policy corresponding to the power adapter type.

The resistance values of R1, R2, and R3 and the capacitive reactance values of C1 and C2 shown in FIG. 5 are only an implementation of the embodiment, and the parameter values may be adjusted properly according to circuit requirements. The GPIO1, GPIO2, and GPIO3 are GPIO interfaces on the processor of the terminal, and the corresponding sequence may be interchanged, and the interfaces may also be replaced with other GPIO interfaces or other interfaces.

In the embodiment of the present invention, using the feature of the electronic switch, and especially the USB analog switch, can ensure the quality and communication rate of the USB signal when implementing the selection and connection of the internal circuit, and the USB compatibility is good. A processor chip is not required to support the Battery Charging V1.1 and/or Battery Charging V1.2 protocol, and therefore the embodiment is applicable to various processor chips. The type of the USB interface of the terminal is not limited, and therefore the embodiment is applicable to terminals of all types of USB interface. No high-cost dedicated chip for identifying the type of USB power supply is required, and no comparator or other separate electronic components are required. The type of USB power supply is detected and identified through an interface of the processor, and no additional detecting or identifying module is required. Thereby, additional components and modules can be reduced, and the costs can be reduced.

It should be noted that the external device herein includes a data transmission device, a standard power adapter, and a non-standard power adapter. The data transmission device includes a USB HOST, for example, a computer or portable computer with a USB interface, a USB hub, or a USB router. The standard power adapter is a power adapter whose D− and D+ pins are shorted. The non-standard power adapter includes power adapters with a not-connected D+ pin and a not-connected D− pin or without D+ and D− pins. The processor includes processors supporting and not supporting the Battery Charging V1.1 and/or Battery Charging V1.2 protocol. The type of the USB interface may be various types of USB interface defined by the USB protocol. Many methods may be used for the terminal to detect whether an external USB device is inserted into the USB interface. The common method is to detect, through the ADC pin of the processor, whether a USB_VBUS power cable has a voltage of approximately 5 V, or detect, through a GPIO (General Purpose Input/Output, that is, general purpose input/output) interface, whether the logic status of the USB_VBUS power cable is high. Herein, when detection is involved, to make the detection result reliable, detection may be performed for many times in a period until several consecutive detection results are the same. All the embodiments provided by this document may implement detection of different external device types, including the data transmission device, standard power adapter, and non-standard power adapter, and the detection accuracy is high.

It should be noted that, in this specification, relationship words such as first and second are merely used to distinguish an entity or operation from another entity or operation, but do not require or imply any actual relationship or sequence between these entities or operations. Moreover, the words "include", "comprise", and any variation thereof are intended to cover a non-exclusive inclusion". Therefore, in the context of a process, method, object, or device that includes a series of elements, the process, method, object, or device not only includes such elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Persons of ordinary skill in the art should understand that all or part of the steps of the method specified in any embodiment above may be implemented by a program instructing relevant hardware. The program may be stored in a readable storage medium on a terminal such as a FLASH, or an EEPROM. When the program runs, the program executes all or part of the steps described above.

A computer-readable storage medium having a program recorded thereon; wherein the program makes a computer execute any of the methods mentioned above.

The preceding embodiments describe the objectives, technical solutions, and benefits of the present invention in detail. It is understandable that different embodiments may be combined and that these embodiments are some exemplary embodiments and are not intended to limit the protection scope of the present invention. Any combination, modification, replacement, or improvement made to the present invention without departing from the spirit and principle of the present invention shall be included in the protection scope of the present invention.

What is claimed is:

1. A method for selecting an internal circuit according to a USB interface status, wherein a first pin of a USB interface of a terminal is connected to a power supply through a pull-up resistor, the first pin is a D− or D+ pin of the USB interface, and a resistance value of the pull-up resistor can ensure that a voltage value obtained by a to-ground pull-down resistor is a logic low level when the pull-up resistor and the to-ground pull-down resistor whose resistance value is approximately 15 KΩ±5% are connected in series to divide a voltage of the power supply and wherein the first pin and a second in of the USB interface of the terminal, in an initial state, are connected to a first interface and a second interface of a processor of the terminal, respectively; the method comprising:

when the terminal detects that an external USB device is inserted into the USB interface of the terminal, detecting whether a level status of the first pin of the USB interface of the terminal is high or low;

if the level status of the first pin of the USB interface of the terminal is low, connecting D− and D+ pins of the USB interface of the terminal to corresponding pins of a USB data communication module of the terminal and controlling charging of the terminal according to a first policy, wherein the first policy is a corresponding policy applied when the external device is a data transmission device; and if the level status of the first pin of the USB interface of the terminal is high, determining whether level statuses of the D− and D+ pins of the USB interface of the terminal are consistent, and if consistent, controlling charging of the terminal according to a second policy; if inconsistent, controlling charging of the terminal according to a third policy, wherein the second policy is a corresponding policy applied when the external device is a standard power adapter, and the third policy is a corresponding policy applied when the external device is a non-standard power adapter;

wherein the determining whether level statuses of the D− and D+ pins of the USB interface of the terminal are consistent comprises setting a second pin of the USB interface of the terminal to a low level; and wherein the second pin of the USB interface is a pin other than the first pin of the USB interface in the D− and D+ pins of the USB interface, determining whether the first pin of the USB interface is at a low level, and if the first pin of the USB interface is at a low level, determining that the level status of the D− pin and the level status of the D+ pin of the USB interface of the terminal are consistent.

2. The method according to claim 1, wherein the connecting the first pin and the second pin of the USB interface of the terminal, in the initial state, to a first interface and a second interface of a processor of the terminal, respectively, is:

connecting the first pin and the second pin of the USB interface of the terminal to a first pin and a second pin of an electronic switch module, respectively, connecting a third pin and a fourth pin of the electronic switch module to the first interface and the second interface of the processor of the terminal, respectively, connecting the first pin and the second pin of the electronic switch module, in the initial state, to the third pin and the fourth pin of the electronic switch module, respectively, connecting the pull-up resistor electrically to the third pin of the electronic switch module and the first interface of the processor of the terminal, and connecting a fifth pin and a sixth pin of the electronic switch module to corresponding pins of the USB data communication module of the terminal;

the connecting D− and D+ pins of the USB interface of the terminal to corresponding pins of a USB data communication module of the terminal is:

connecting, by the electronic switch module under control of a first control signal, the first pin and the second pin of the electronic switch module to the fifth pin and the sixth pin of the electronic switch module, respectively, so that the D− and D+ pins of the USB interface of the terminal are electrically connected to the corresponding pins of the USB data communication module of the terminal.

3. The method according to claim 2, wherein the first control signal is sent by the processor of the terminal through a third interface to a control pin of the electronic switch module.

4. The method according to claim 2, wherein the first control signal is sent by the processor of the terminal through a third interface to a control signal module and transferred by the control signal module to a control pin of the electronic switch module; and the connecting the first pin and the second pin of the electronic switch module, in the initial state, to the third pin and the fourth pin of the electronic switch module, respectively, is:

connecting, by the electronic switch module under control of an initial control signal output by the control signal module, the first pin and the second pin of the electronic switch module to the third pin and the fourth pin of the electronic switch module, respectively, wherein the initial control signal is output by the control signal module and sent to a control pin of the electronic switch module.

5. A terminal for selecting an internal circuit according to a USB interface status, wherein the terminal comprises:

a USB interface, which has a first pin and a second pin, wherein the first pin is a D− or D+ pin of the USB interface, and the second pin is a pin other than the first pin in the D− and D+ pins of the USB interface supply and wherein the first pin and a second pin of the USB interface of the terminal, in an initial state, are connected to a first interface and a second interface of a processor of the terminal, respectively;

a USB data communication module, configured to perform data communication with an external USB device;

a pull-up resistor, with one end being connected to the first pin of the USB interface and the other end being connected to a power supply, wherein a resistance value of the pull-up resistor can ensure that a voltage value obtained by a to-ground pull-down resistor is a logic low level when the pull-up resistor and the to-ground pull-down resistor whose resistance value is approximately 15 KΩ±5% are connected in series to divide a voltage of the power supply;

a first detecting unit, configured to detect whether the external USB device is inserted into the USB interface;

the processor of the terminal, configured to: when the first detecting unit detects that the external USB device is inserted into the USB interface, detect whether a level status of the first pin of the USB interface is high or low, and when the level status of the first pin of the USB interface is low, output a first control signal and control charging of the terminal according to a first policy; when the level status of the first pin of the USB interface is high, further determine whether level statuses of the D− and D+ pins of the USB interface of the terminal are consistent, and if consistent, control charging of the terminal according to a second policy; if inconsistent, control charging of the terminal according to a third policy, wherein the first policy is a corresponding policy applied when the external device is a data transmission device, the second policy is a corresponding policy applied when the external device is a standard power adapter, and the third policy is a corresponding policy applied when the external device is a non-standard power adapter, wherein the processor of the terminal comprises:

a first detection controlling unit, configured to: when the first detecting unit detects that the external USB device is inserted into the USB interface, detect whether the level status of the first pin of the USB interface is high or low, and when the level status of the first pin of the USB interface is low, output the first control signal and control charging of the terminal according to the first policy; and a second detection controlling unit, configured to:

when the first detection controlling unit detects that a level of the first pin of the USB interface is a high level, determine whether the level statuses of the D− and D+ pins of the USB interface are consistent, and if consistent, control charging of the terminal according to the second policy, or if inconsistent, control charging of the terminal according to the third policy; and when the first detection controlling unit detects that the level of the first pin of the USB interface is a high level, set a level of the second in of the USB interface of the terminal to a low level, determine whether the level of the first pin of the USB interface is a low level, and if the level of the first pin of the USB interface is a low level, determine that the level status of the D− pin and the level status of the D+ pin of the USB interface are consistent; if the level of the first pin of the USB interface is not a low level, determine that the level status of the D− pin and the level status of the D+ pin of the USB interface are inconsistent; and a switching unit, configured to connect the D− and D+ pins of the USB interface to corresponding pins of the USB data communication module according to the first control signal.

6. The terminal according to claim 5, wherein the processor of the terminal has a first interface and a second interface, and the first pin and the second pin of the USB interface, in an initial state, are connected to the first interface and the second interface of the processor, respectively;

the first detection controlling unit is configured to: when the first detecting unit detects that the external USB device is inserted into the USB interface, detect whether the level status of the first interface of the processor is high or low, and when the level status of the first interface of the processor is low, output the first control signal and control charging of the terminal according to the first policy; and the second detection controlling unit is configured to: when the first detection controlling unit detects that a level of the first interface of the processor is a high level, set a level of the second interface of the processor to a low level, determine whether the level of the first interface of the processor is a low level, and if the level of the first interface of the processor is a low level, determine that the level status of the D− pin and the level status of the D+ pin of the USB interface are consistent, and control charging of the terminal according to the second policy; if the level of the first interface of the processor is not a low level, determine that the level status of the D− pin and the level status of the D+ pin of the USB interface are inconsistent, and control charging of the terminal according to the third policy.

7. The terminal according to claim 6, wherein the switching unit is an electronic switch having a first pin, a second pin, a third pin, a fourth pin, a fifth pin, and a sixth pin, wherein: the first pin and the second pin of the electronic switch are electrically connected to the first pin and the second pin of the USB interface, respectively; the third pin and the fourth pin of the electronic switch are electrically connected to the first interface and the second interface of the processor, respectively; the fifth pin and the sixth pin of the electronic switch are connected to the corresponding pins of the USB data communication module; the first pin and the second pin of the electronic switch, in the initial state, are electrically connected to the third pin and the fourth pin of the electronic switch, respectively; and the pull-up resistor is electrically connected to the third pin of the electronic switch and the first interface of the processor; and the electronic switch is configured to connect, according to the first control signal, the first pin and the second pin of the electronic switch to the fifth pin and the sixth pin of the electronic switch, respectively, so that the D− and D+ pins of the USB interface of the terminal are electrically connected to the corresponding pins of the USB data communication module of the terminal.

8. The terminal according to claim 7, wherein, the processor of the terminal further has a third interface; the electronic switch further has a control pin; and the first detection controlling unit is specifically configured to: when the first detecting unit detects that the external USB device is inserted into the USB interface, detect whether the level status of the first interface of the processor is high or low, and when the level status of the first interface of the processor is low, output the first control signal through the third interface of the processor and send the first control signal to the control pin of the electronic switch, and control charging of the terminal according to the first policy.

9. The terminal according to claim 7, wherein, the processor of the terminal further has a third interface; the electronic switch further has a control pin; and the terminal further comprises a control signal module, configured to: in an the initial state, generate an initial control signal and send the initial control signal to the control pin of the electronic switch, and when the first detection controlling unit outputs the first control signal, receive the first control signal from the third interface of the processor and send the first control signal to the control pin of the electronic switch; and the electronic switch is configured to: receive, through the control pin, the initial control signal sent by the control signal module, and connect the first pin and the second pin of the electronic switch to the third pin and the fourth pin of the electronic switch module according to the initial control signal, respectively; and receive the first control signal through the control pin, and connect the first pin and the second pin of the electronic switch to the fifth pin and the sixth pin of the electronic switch according to the first control signal, respectively, so that the D− and D+ pins of the USB interface of the terminal are electrically connected to the corresponding pins of the USB data communication module of the terminal.

10. A nontransitory computer-readable storage medium having a program recorded thereon; wherein the program makes a computer execute and perform a method for selecting an internal circuit according to a USB interface status, wherein a first pin of a USB interface of a terminal is connected to a power supply through a pull-up resistor, the first pin is a D− or D+ pin of the USB interface, and a resistance value of the pull-up resistor can ensure that a voltage value obtained by a to-ground pull-down resistor is a logic low level when the pull-up resistor and the to-ground pull-down resistor whose resistance value is approximately 15 KΩ±5% are connected in series to divide a voltage of the power supply and wherein the first pin and a second in of the USB interface of the terminal, in an initial state, are connected to a first interface and a second interface of a processor of the terminal, respectively; comprising:

when the terminal detects that an external USB device is inserted into the USB interface of the terminal, detecting whether a level status of the first pin of the USB interface of the terminal is high or low by detecting whether the level status of the first interface of the processor of the terminal is high or low;

if the level status of the first pin of the USB interface of the terminal is low, connecting D− and D+ pins of the USB interface of the terminal to corresponding pins of a USB data communication module of the terminal and controlling charging of the terminal according to a first policy, wherein the first policy is a corresponding policy applied when the external device is a data transmission device; and if the level status of the first pin of the USB interface of the terminal is high, determining whether level statuses of the D− and D+ pins of the USB interface of the terminal are consistent, and if consistent, controlling charging of the terminal according to a second policy; if inconsistent, controlling charging of the terminal according to a third policy, wherein the second policy is a corresponding policy applied when the external device is a standard power adapter, and the third policy is a corresponding policy applied when the external device is a non-standard power adapter;

wherein the determining whether level statuses of the D− and D+ pins of the USB interface of the terminal are consistent comprises setting a second in of the USB interface of the terminal to a low level by setting the second interface of the processor of the terminal to a low level; and wherein the second pin of the USB interface is a pin other than the first pin of the USB interface in the D− and D+ pins of the USB interface, determining whether the first pin of the USB interface is at a low level, and if the first pin of the USB interface is at a low level, determining that the level status of the D− pin and the level status of the D+ pin of the USB interface of the terminal are consistent.

\* \* \* \* \*

UNITED STATES PATENT AND TRADEMARK OFFICE
CERTIFICATE OF CORRECTION

PATENT NO. : 9,128,691 B2
APPLICATION NO. : 13/657292
DATED : September 8, 2015
INVENTOR(S) : Shengcai Liu It is certified that error appears in the above-identified patent and that said Letters Patent is hereby corrected as shown below:

In the Claims

In column 17, claim 1, line 27, after "first pin and a second" replace "in" with --pin--.

In column 19, claim 5, line 45, after "set a level of the second" replace "in" with --pin--.

In column 21, claim 10, line 24, after "first pin and a second" replace "in" with --pin--.

In column 22, claim 10, line 22, after "setting a second" replace "in" with --pin--.

Signed and Sealed this
Eighth Day of March, 2016

Michelle K. Lee
*Director of the United States Patent and Trademark Office*